E. M. SWIFT.
AIR BRAKE SYSTEM.
APPLICATION FILED FEB. 7, 1907.
931,234.
Patented Aug. 17, 1909.
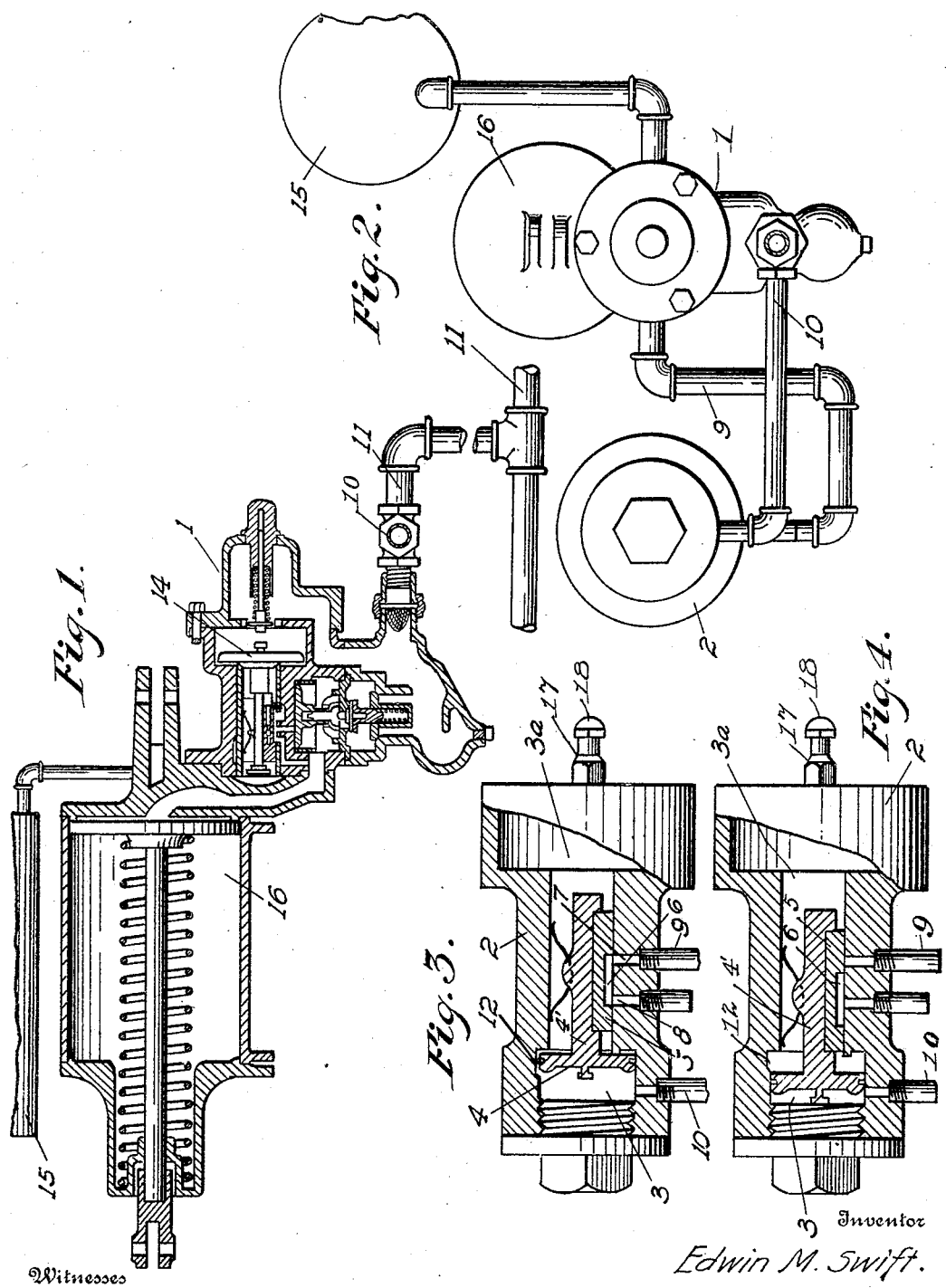
Witnesses
Edward W. Cressman.
Arlita Adams.
Inventor
Edwin M. Swift.
By Adams & Brooks
Attorney

UNITED STATES PATENT OFFICE.

EDWIN M. SWIFT, OF BALLARD, WASHINGTON.

AIR-BRAKE SYSTEM.

No. 931,234.  Specification of Letters Patent.  Patented Aug. 17, 1909.

Application filed February 7, 1907. Serial No. 356,266.

*To all whom it may concern:*

Be it known that I, EDWIN M. SWIFT, a citizen of the United States of America, and a resident of the city of Ballard, in the county of King and State of Washington, have invented certain new and useful Improvements in Air-Brake Systems, of which the following is a specification.

My invention has for one of its objects the provision of improvements in air brake systems by which a practically instantaneous release of the brakes throughout the train can be produced.

A further object is to provide improved apparatus through the medium of which the train line and respective auxiliary reservoirs can be recharged to approximately maximum pressure without releasing the brakes.

With the above and other equally desirable objects in view, the invention resides in the construction, arrangement and combinations of parts hereinafter described and succinctly pointed out in the appended claims.

Referring now to the accompanying drawings in which like numerals of reference indicate like parts throughout the several views: Figure 1 is a fragmentary sectional view of a triple valve, to which my improvement is connected, and the adjacent parts of an air brake system. Fig. 2 is an end view thereof, showing my invention. Fig. 3 is a detail view showing my improved device removed from the air brake system, a portion of the wall of the casing thereof being broken away, and Fig. 4 is a similar view with the piston and valve moved, as when the brakes are applied.

In the drawing, I have shown my improvement in conjunction with a common form of Westinghouse triple valve, indicated by reference numeral 1. Said improvement as now considered, consists of a suitable casing 2 divided into opposite chambers 3 and 3ª by a piston 4, which chambers and piston form what I term a pneumatic means for controlling the operation of a valve 5. This valve 5 is carried by a stem 4' of said piston, and is formed with a channel 6 which normally establishes communication between inlet and outlet ports 7 and 8 respectively of casing 2.

Reference numeral 9 indicates a pipe which leads from the exhaust port of triple valve 1 to inlet port 7 of casing 2, and a suitable pipe, as 10 communicating with chamber 3 has direct communication with the train line, indicated by numeral 11.

When the brakes are not applied, piston 4 is in the position shown in Fig. 3 and air can pass from chamber 3, which has direct communication with the train line, through a groove or channel 12 formed in the wall of casing 2, into chamber 3ª, so that normally the air pressure in the respective chambers is equal. When the brakes are applied by reducing the air presure in the train pipe, the pressure in chamber 3 is correspondingly reduced and the excess pressure in chamber 3ª forces piston 4 to the position shown in Fig. 4 causing valve 5 to close port 7, and preventing air from escaping through channel 12, as clearly shown. Now upon recharging the train line, the piston 14 of triple valve 1 is moved back to its normal position, establishing communication between the train pipe and auxiliary reservoir 15 so that the latter will be recharged, and establishes communication between the brake cylinder 16 and the exhaust port of the triple valve. Through the provision of my improvement, however, but little air will escape from the brake cylinder, as the progress of that passing through the triple valve is arrested by valve 5, and valve 5 obviously will not be opened until the pressure in the train pipe is approximately up to normal when it overcomes the resistance of the air in chamber 3ª and moves piston 4 back to its normal position. By my improved construction, therefore the air pressure in the train pipe throughout the train can be raised to approximately normal pressure, and the auxiliary reservoirs are recharged, before the brakes are released. Further, I am enabled to graduate the release of the brakes a few pounds at a time and hold them at any pressure, this being accomplished by first charging the train pipe to maximum or approximately maximum pressure, whereupon piston 4 is moved to normal position and valve 5 establishes communication between the brake cylinder and atmosphere, then, when sufficient air is released from the brake cylinder, making a slight reduction in train pipe so that piston 5 will be moved to the position shown in Fig. 3 and port 7 closed.

In view of the foregoing, it will be observed that my improved device can be readily installed in an air brake system, such as is now in common use, without requiring any alteration in the construction thereof.

Having thus described my invention, what I claim as new and desire to secure by Letters Patent of the United States of America, is:—

1. An automatic retaining valve for fluid pressure brakes, comprising a pressure retaining reservoir and a valve mechanism normally open and connected with the train pipe, the triple valve exhaust and the said pressure retaining reservoir, and arranged when in normal or open position to allow charging of the said pressure retaining reservoir from the train pipe and to connect the triple valve exhaust with the atmosphere, the valve mechanism moving into closed position by pressure from the said pressure retaining valve on reducing the pressure in the train pipe when setting the brakes, to cut off the pressure retaining reservoir from the train pipe and to close the triple valve exhaust to the atmosphere, the said valve mechanism, on increasing the pressure in the train pipe when releasing the brakes, returning to normal open position by preponderance of pressure in the train pipe over that in the said pressure retaining reservoir.

2. An automatic retaining valve for fluid pressure brakes, comprising a pressure retaining reservoir, a casing having connection with the train pipe, the triple valve exhaust and the said pressure retaining reservoir, a piston movable in the said casing, said piston controlling the communication between the train pipe and pressure retaining reservoir, and controlled by pressure from the train pipe and the said pressure-retaining reservoir, and a valve in the said casing and moving with the said piston, the said valve normally opening the triple valve exhaust to the atmosphere, and the said valve being moved into a closed position by the said piston on setting the brakes.

3. An automatic retaining valve for fluid pressure brakes, comprising a pressure retaining reservoir, a casing having connection with the train pipe, the triple valve exhaust and the said pressure-retaining reservoir, a piston movable in the said casing and controlled by pressure from the train pipe and the said pressure retaining reservoir, the said piston controlling a feed groove in the casing and establishing communication between the said pressure-retaining said casing and moving with the said piston, the said valve normally opening the triple valve exhaust to the atmosphere, and the said valve being moved into a closed position by the said piston on setting the brakes.

4. An automatic retaining valve for fluid pressure brakes comprising a casing having connection with the train pipe and the triple valve exhaust, a piston in said casing, said casing being divided by said piston into opposite chambers, one of said chambers being in direct communication with the train pipe, the other chamber receiving air from said first named chamber, said piston being movable to control the communication between said chambers, and being moved by the air in said chambers, and a valve in said casing connected to move with said piston, the said valve normally opening the triple valve exhaust to the atmosphere and said valve being moved to a closed position by said piston upon setting the brakes.

5. An automatic retaining valve for fluid pressure brakes comprising a casing provided with a pair of chambers connected to receive air from the train pipe, a piston in said casing between the chambers thereof controlling the flow of air from the train pipe into one of said chambers, and being moved by preponderance of pressure in one of said chambers over that in the other, and a valve connected to move with said piston and normally opening the triple valve exhaust to the atmosphere, and being moved into a closed position by the said piston on setting the brakes.

6. An automatic retaining valve for fluid pressure brakes comprising a casing having connection with the train pipe and the triple valve exhaust, said casing being provided with a chamber forming a pressure retaining reservoir, normally receiving air from said train pipe, a piston movable in said casing, said piston controlling the communication between the train pipe and said pressure retaining reservoir, and a valve in said casing connected to move with said piston, said valve normally opening the triple valve exhaust to the atmosphere and being moved to a closed position by the said piston on setting the brakes.

Signed at Seattle, Washington, this 18th day of January 1907.

EDWIN M. SWIFT.

Witnesses:
STEPHEN A. BROOKS,